United States Patent
Smeltz

(10) Patent No.: US 11,905,212 B1
(45) Date of Patent: Feb. 20, 2024

(54) METHOD OF FORMING A NON-DISPERSIBLE GRANULAR SUBSTRATE AND THE GRANULAR SUBSTRATES FORMED THEREBY

(71) Applicant: The National Lime and Stone Company, Findlay, OH (US)

(72) Inventor: Jonathan Smeltz, Findlay, OH (US)

(73) Assignee: The National Lime and Stone Company, Findlay, OH (US)

( * ) Notice: Subject to any disclaimer, the term of this patent is extended or adjusted under 35 U.S.C. 154(b) by 2 days.

(21) Appl. No.: 17/151,303

(22) Filed: Jan. 18, 2021

Related U.S. Application Data

(60) Provisional application No. 62/963,208, filed on Jan. 20, 2020.

(51) Int. Cl.
| | |
|---|---|
| *C04B 14/02* | (2006.01) |
| *C04B 18/02* | (2006.01) |
| *C04B 14/14* | (2006.01) |
| *C04B 14/28* | (2006.01) |
| *C04B 14/18* | (2006.01) |
| *C09K 17/06* | (2006.01) |
| *A01K 1/015* | (2006.01) |
| *A01N 25/12* | (2006.01) |

(52) U.S. Cl.
CPC .......... *C04B 18/021* (2013.01); *A01K 1/0154* (2013.01); *C04B 14/14* (2013.01); *C04B 14/185* (2013.01); *C04B 14/28* (2013.01); *C04B 18/027* (2013.01); *C09K 17/06* (2013.01); *A01N 25/12* (2013.01)

(58) Field of Classification Search
CPC .......... C04B 2/02; C04B 14/02; C04B 14/36; C04B 22/064; C04B 28/10; C04B 14/14; C04B 14/16; C04B 14/18; A01K 1/0154
See application file for complete search history.

(56) References Cited

U.S. PATENT DOCUMENTS

| | | | |
|---|---|---|---|
| 10,561,118 B1 | 2/2020 | Welshimer et al. | |
| 10,577,281 B1 | 3/2020 | Welshimer et al. | |
| 2012/0280420 A1* | 11/2012 | Boxley | A01K 1/0154 264/140 |
| 2017/0183264 A1* | 6/2017 | Hempel | C04B 40/0039 |

FOREIGN PATENT DOCUMENTS

| | | | | |
|---|---|---|---|---|
| WO | WO-2014092667 A1 | * | 6/2014 | ............ C04B 28/18 |

OTHER PUBLICATIONS

Silva de Vargas et al., Strength development of alkali-activated fly ash produced with combined NaOH and Ca(OH)2 activators, Cement and Concrete Composites, vol. 53, Oct. 2014, pp. 341-34 (Year: 2014).*

Zhao et al., Investigation into the effect of calcium on the existence form of geopolymerized gel product of fly ash based geopolymers, Cement and Concrete Composites, vol. 103, Oct. 2019, pp. 279-292 (Year: 2019).*

Ali Allahverdi et al, Chemical Activation and Set Acceleration of Lime-Natural Pozzolan Cement, Ceramic Silikaty 50 (4), Jan. 2006, pp. 193-199, Iran University of Science and Technology, Tehran, Iran.

E.R. Grist et al, Compressive Strength Development of Binary and Ternary Lime-Pozzolan Mortars, Materials and Design 52 (2013), pp. 514-523, U.S.

Norbert J. Delatte et al, Lessons from Roman Cement and Conrete, j.Prof.Issues Eng.Educ.Pract., 127 (3), 2001, pp. 109-115, Cleveland, Ohio. U.S.

Helen Goldsworth et al, Mortor Studies Towards the Replication of Roman Concrete, Archaeometry 51 (6), 2009, pp. 932-946, Melhbourne, victoria, Australia.

Marie D. Jackson et al, Phillipsite and AI-tobermorite Mineral Cements Produced Through Low-Temperature Water-Rock Reactions in Roman Marine Concrete, American Mineralogist, 2017, pp. 1435-1450, vol. 102, U.S.

John Peter Oleson et al, Reproducing a Roman Maritime Structure with Vitruvian Pozzolanic Concrete, Journal of Roman Archaeology 19, Jan. 2006, pp. 29-52.

Marie D. Jackson et al, Unlocking the Secrets of AI-Tobermorite in Roman Seawater Concrete, American Mineralogist, 2013, pp. 1669-1687, vol. 98.

* cited by examiner

*Primary Examiner* — Hoa (Holly) Le
(74) *Attorney, Agent, or Firm* — Marshall & Melhorn, LLC

(57) ABSTRACT

A method of making a non-dispersible granular substrate includes forming a batch mixture comprised of one or more mineral-filler components, one or more pozzolan components, one or more hydrated lime components, and water, and co-pelletizing the batch mixture to form a plurality of granules. The resulting granules are non-dispersible in water, have a bulk density of 25 lb/ft$^3$ or more and 75 lb/ft$^3$ or less, and have a moisture content of from 0% to 16%.

18 Claims, No Drawings

METHOD OF FORMING A NON-DISPERSIBLE GRANULAR SUBSTRATE AND THE GRANULAR SUBSTRATES FORMED THEREBY

BACKGROUND OF THE INVENTION

The invention relates to granular materials used as animal bedding (e.g., cat litter) or carriers for active chemical agents. Such granular materials are typically 1 to 1.5 millimeters in average particle size (approx. US mesh 8×16), with a bulk density less than 65 pounds per cubic foot ($lb/ft^3$) and with a weight % resistance to attrition ("RTA") of at least 85%.

Animal litter granules are usually blended with a "clumping agent" to assure that the litter (when moistened) will form a firm and solid clump which can be easily removed from the litter box. Animal litter granules which soften when exposed to moisture can form clumps in the litter box which are too soft to be easily removed. The granules of the present invention remain solid when exposed to moisture enhancing the performance of the litter product.

SUMMARY OF THE INVENTION

The granular substrate of the invention is non-dispersible in water and remains solid when exposed to moisture. The granular substrate is formed of a plurality of granules, each granule being a mixture including one or more mineral-filler components, a binding agent formed of a reaction between one or more pozzolan components and hydrated lime, and optionally one or more lightweight additives. The one or more pozzolan components could be, for example, crushed pumice, expanded perlite, fly ash, ground granulated blast furnace slag, metakaolin, or silica fume. The granular substrate could be used, for example, as animal bedding (e.g., cat litter) or a carrier for active chemical agents such as pesticides or soil amendments.

A method of making a granular substrate that is non-dispersible and non-softening, when exposed to moisture, includes forming a batch mixture including one or more mineral-filler ingredients, one or more hydrated lime ingredients, one or more pozzolan ingredients, water, and optionally one or more lightweight additives. This batch mixture is then co-pelletized to form a plurality of granules, and the granules are dried to a moisture content of about 2% to 16%. In preferred embodiments, the granules are stored at a temperature ranging from about 10° C. to about 80° C., in a manner which retains the original moisture content, to enable the complete or nearly complete reaction of the pozzolan and the hydrated lime. The resulting granules are non-dispersible in water, have a bulk density of 25 $lb/ft^3$ or more and 75 $lb/ft^3$ or less, and have a moisture content of from 0% to 16%.

DETAILED DESCRIPTION OF THE INVENTION

It is to be understood that the invention may assume various alternative orientations and step sequences, except where expressly specified to the contrary. It is also to be understood that the specific materials and processes described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

The invention uses a binding agent including the product of a reaction between a pozzolan and hydrated lime to generate granules which are both non-dispersible in water and remain solid when exposed to moisture. A pozzolan, as used herein and as defined by ASTM C125-20, is a siliceous or siliceous and aluminous material which, in itself, possesses little or no cementitious value but which will, in finely divided form in the presence of moisture, react chemically with calcium hydroxide at ordinary temperature to form compounds possessing cementitious properties.

The water dispersibility of the granular substrate was tested by placing about 10 grams of the granules into 100 ml of water at room temperature in a ~250 ml closed clear glass container. After one minute, the container was inverted, and the time was observed until the granular material completely dispersed. The granules of the present invention showed no disintegration after 5 minutes following inversion, and thus are deemed to be essentially non-dispersible in water.

The property of remaining solid when moistened was tested by fingering granules which had remained submersed in water for 8 minutes and for 16 minutes. If 80% or more of the moistened granules were determined to be solid after 8 minutes and 75% or more were determined to be solid after 16 minutes, then the granules were judged to be sufficiently solid following moistening.

The granules of the invention preferably are lightweight, show high liquid absorption capacity, show excellent long-term storage stability, and show strength (resistance to attrition) sufficient to endure additional commercial processing and material handling.

It is to be understood that the specific devices and processes described herein are simply exemplary embodiments of the inventive concepts. Hence, specific dimensions and other physical characteristics relating to the embodiments disclosed herein should not be considered as limiting, unless the claims expressly state otherwise. Unless stated otherwise, all percentages expressed herein are by weight.

In accordance with the invention, a granular material or granular substrate includes one or more mineral-filler components, a binding agent formed of a reaction between a pozzolan and hydrated lime, water, and optionally one or more lightweight additives, which may be included to reduce bulk density of the granules. These components are agglomerated using a pin mixer and pan, or other conventional agglomeration equipment and processes.

The granules may then be heated in a dryer to reduce their moisture content to a range of values between about 2% and about 16%.

Immediately after granulation and optional partial drying, which may typically require 5 to 15 minutes in a commercial production facility, the granules may not have a resistance of attrition sufficient to endure commercial handling processes or remain solid when moistened. The portion of moisture retained in the granules following the partial drying step enables additional reaction between the pozzolan and hydrated lime and imparts, after curing time which may be about 24 hours to 96 hours in storage, the property that allows the granules have strength sufficient to endure commercial screening, storage, and material handling operations and remain solid when moistened.

The mineral-filler component/ingredient, as referenced herein, is a mineral (i.e., a naturally occurring, inorganic, crystalline substance with a fixed chemical composition) and/or a non-pozzolanic mineral-derived material (i.e., an inorganic substance that has been synthetically produced from one or more minerals and need not be crystalline or possess a fixed chemical composition which is not a pozzolan).

The one or more mineral-filler ingredients are preferably 15% to 90% of the final granular substrate composition. The one or more mineral-filler ingredients preferably are finely divided mineral or non-pozzolan mineral-derived materials having bulk density greater than about –7-60 lb/ft³ with a particle sizing of about 100% passing US 30 mesh and about 10% or more passing 200 mesh. Particle size of about 100% passing US 30 mesh, 70% to 95% passing 100 mesh, and 35% to 75% passing the 200 mesh sieve is believed to be most preferable.

The one or more mineral-filler ingredients may be formed of any mineral (e.g., dolomite, frac sand, granite dust, limestone, marble dust, mason sand, natural sand) and/or non-pozzolan mineral-derived material (e.g., ground recycled concrete) or other mineral and/or non-pozzolan mineral-derived powder(s) suitable for use in animal litter or carrier products which meet the bulk density and particle size distribution requirements. The one or more mineral-filler ingredients preferably include dolomite and/or limestone, with dolomite being most preferred.

The pozzolan component/ingredient useful in accordance with the invention preferably may be crushed pumice, diatomaceous earth, expanded perlite, expanded shale, fly ash, ground granulated blast furnace slag, metakaolin (or other calcined clays), rice husk ash, silica fume, and volcanic ash, or combinations thereof. The pozzolan ingredient preferably accounts for 10% to 30% of the final granular substrate composition.

The hydrated lime ingredient useful in accordance with the invention preferably may be either calcium/high calcium or dolomitic normally hydrated lime (commercially designated Type N) or pressure hydrated lime (commercially designated Type S). Calcium/high calcium hydrated lime is most preferable. The hydrated lime ingredient preferably accounts for 5% to 25% of the final granular substrate composition.

The weight % ratios of hydrated lime to pozzolans are dependent on the properties of the hydrated lime and pozzolan products selected for synthesis and will vary depending on the particle size, particle shape, porosity, bulk density, degree of crystallinity, and impurity contents of a given product.

The most advantageous weight % ratio of hydrated lime to pozzolan in the composition depends on the specific pozzolan ingredient. For example, if expanded perlite was selected as the pozzolan used in the composition, then the weight % ratio of hydrated lime to expanded perlite may range between 0.3 and 1.5 with the most advantageous weight % ratio of hydrated lime to expanded perlite ranging between 1.0 and 1.2. If crushed pumice was selected as the pozzolan used in the composition, then the weight % ratio of hydrated lime to crushed pumice may range between 0.2 and 1.0 with the most advantageous weight % ratio of hydrated lime to crushed pumice ranging between 0.4 and 0.8. If undensified silica fume was selected as the pozzolan used in the composition, then the weight % ratio of hydrated lime to undensified silica fume may range between 0.5 and 1.2 with the most advantageous weight % ratio of hydrated lime to undensified silica fume being 0.85.

The inclusion of one or more lightweight additives in the batch for forming the granular substrates of the invention is optional, depending largely on the bulk density desired of the resulting granules. Accordingly, the granules of the invention may include one or more lightweight additives amounting to from 0% to 40% of the final granular substrate composition.

The one or more lightweight additives are preferably dry, powder materials having a bulk density less of than 35 lb/ft³ and preferably having a sizing of about 100% passing a US 20 mesh sieve and about 50% or more passing a US 40 mesh sieve with a sizing of 95% or more passing US 40 mesh sieve being most preferred.

Suitable lightweight additives include cellulose, diatomaceous earth, expanded silica, expanded perlite, ground wheat straw, particle board flour, pulverized rice hulls, wood flour, and other materials meeting the particle size and bulk density properties would also be suitable.

The bulk density of the granular material of the invention can vary significantly to suit the desired application depending in large part on the amount of lightweight additive included in the formulation. The bulk density of the granules is preferably 25 to 75 lb/ft³, more preferably between 35 and 65 lb/ft³, and most preferably 40 to 55 lb/ft³.

In addition to the one or more mineral-filler components, one or more pozzolan components, one or more hydrated lime components, water, and optionally one or more light weight additive(s), the granular substrates of the invention may also optionally be formed with other additives, such as chemical additives, for example calcium chloride to enhance the pozzolan—hydrated lime reaction rate and hasten the attainment of strength of the granules.

In certain embodiments of the invention, the granular substrates preferably exhibit an RTA of 85% or more, and most preferably 95% or more, in accordance with ASTM E 728-91 Volume 11.04, a most preferred particle size distribution of 6×30 mesh (for animal litter) or 8×16 mesh (for carriers), virtually no dispersibility in water, exhibit the property of remaining solid when moistened, a liquid absorption capacity of 10% or more, a pH of about 7 to about 12, a moisture content of 0% to about 16%, and an angle of repose of 40° maximum, with 35° or lower being most preferred. The angle of repose of a granular material is the steepest angle of incline relative to the horizontal plane to which a material can be piled without slumping.

Other materials may be applied to the resulting granules in order to form a suitable animal bedding or litter therefrom. Such materials would typically include, as examples, a clumping agent and odor control agent. The clumping agent enables the granules of the litter composition to agglomerate into a mass upon contact with animal urine. Examples of clumping agents include sodium bentonite, xanthan gum, guar gum, etc. The clumping agent may be applied to the granules in any suitable conventional manner.

The chemical and physical properties of a pesticide or soil amendment may enable including the active chemical agent into the granules when the raw materials are blended initially. Alternatively, the pesticide or soil amendment may be applied to the granular substrate in any suitable conventional manner.

EXAMPLES

As used herein, lb/ft³ stands for pounds per cubic foot, UOM stands for units of measure, and screen mesh sizes are all U.S. standard mesh sizes.

Example 1: The recipe for example 1 was as follows. The dry ingredients 111.4 grams of high calcium hydrated lime (Graymont), 93.6 grams of expanded perlite (grade HP-1500, Dicaperl Minerals Corp), and 422.8 grams of dried dolomite stone dust (approximately 65% passing 200 mesh) were thoroughly blended in the order listed above into a homogeneous dry mixture. The mixture of the dry ingredients was then blended with 249.5 grams of water in an ~2-quart capacity stainless steel mixing bowl using a hand mixer fitted with traditional "flat blade" metal beaters to wet and thoroughly blend all the ingredients within about 10 seconds. Mixing was continued for approximately 30 seconds to initiate the transformation of the mixture into discrete granules.

Following the initial blending the granulation continued in the same bowl for approximately 2 minutes using a hand mixer with stiff spiral wire beaters. A fine water spray of 31.1 grams in total was added from a hand-held spray bottle to increase the size of the granules, which for this example was about 16 mesh. These mixing procedures simulated the granulation which would occur in a commercial process pin mixer.

Following granulation with the hand mixer, the entire batch was tumbled for approximately two minutes (~50 revolutions) in a 16-inch diameter by 3.5 inch deep pelletizing pan inclined at 45° above horizontal to improve the roundness of the granules and provide a better estimate of granule properties if the granules would be produced in a commercial pin mixer/pelletizing pan process.

Following granulation, the batch had a moisture content of about 30% and bulk density of 38.9 lb/ft$^3$. The batch was then divided into four smaller sample batches which were cured using the following procedures.

Example 1—Curing Procedure A: One sample batch was stored in sealed containers, to maintain moisture content, for 27 days at room temperature and then dried for one day at room temperature.

Properties for a 6×35 fraction of this sample batch were:
RTA=77.6%
Weight % moisture loss after drying one day at room temp=24.6%
Weight % moisture content (following drying at room temp)=3.3%
Bulk Density=33.7 lb/ft$^3$
pH=11.4
% solid after moistened 8 minutes=70
% solid after moistened 16 minutes=70

Example 1—Curing Procedure B: A second sample batch was stored in sealed containers, to maintain moisture content, for 27 days at 58.3° C. and then dried for one day at room temperature.

Properties for a 6×35 fraction were:
RTA=84.4%
Weight % moisture loss after drying one day at room temp=21.3%
Weight % moisture content (following drying at room temp)=5.7%
Bulk Density=33.4 lb/ft$^3$
pH=10.9
% solid after moistened 8 minutes=80
% solid after moistened 16 minutes=80

Example 1—Curing Procedure C: A third sample batch was dried at 110° C. to about 18% moisture, stored in sealed containers, to maintain moisture content, for 28 days at room temperature and then tested.

Properties for a 6×35 fraction were:
RTA=85.6%
Weight % moisture content (as tested)=15.4%
Bulk Density=38.9 lb/ft$^3$
pH=11.9
% solid after moistened 8 minutes=80
% solid after moistened 16 minutes=80

Example 1—Curing Procedure D: One sample batch was dried at 110° C. to about 18% moisture, stored in sealed containers, to maintain moisture content, for 28 days at 58.3° C. and then tested.

Properties for a 6×35 fraction were:
RTA=88.4%
Weight % moisture content (as tested)=14.0%
Bulk Density=38.6 lb/ft$^3$
pH=11.8
% solid after moistened 8 minutes=90
% solid after moistened 16 minutes=90

Example 2: The recipe for example 2 was as follows. The dry ingredients of 91.6 grams of high calcium hydrated lime (Graymont), 114.6 grams of crushed pumice (Hess grade—325), and 417.0 grams of dried dolomite stone dust (approximately 65% passing 200 mesh) were thoroughly blended in the order listed above into a homogeneous dry mixture. The mixture of the dry ingredients was then blended with 99.9 grams of water in an ~2-quart capacity stainless steel mixing bowl using a hand mixer fitted with traditional "flat blade" metal beaters to wet and thoroughly blend all the ingredients within about 10 seconds. Mixing was continued for approximately 30 seconds to initiate the transformation of the mixture into discrete granules.

Following the initial blending the granulation continued in the same bowl for approximately 2 minutes using a hand mixer with stiff spiral wire beaters. A fine water spray of 18.8 grams in total was added from a hand-held spray bottle to increase the size of the granules, which for this trial batch was about 16 mesh. These mixing procedures simulated the granulation which would occur in a commercial process pin mixer.

Following granulation with the hand mixer, the entire batch was tumbled for approximately two minutes (~50 revolutions) in a 16-inch diameter by 3.5 inch deep pelletizing pan inclined at 45° above horizontal to improve the roundness of the granules and provide a better estimate of granule properties if the granules would be produced in a commercial pin mixer/pelletizing pan process.

Following granulation, the batch had a moisture content of about 17% and bulk density of 59.5 lb/ft$^3$. The trial batch was then divided into three smaller sample batches which were cured using the following procedures.

Example 2—Curing Procedure A: One sample batch was stored in sealed containers, to maintain moisture content, for 26 days at room temperature and then dried for one day at room temperature.

Properties for a 6×35 fraction were:
RTA=85.6%
Weight % moisture loss after drying one day at room temp=11.5%
Weight % moisture content (following drying at room temp)=1.9%
Bulk Density=59.3 lb/ft$^3$
pH=11.5
% solid after moistened 8 minutes=85
% solid after moistened 16 minutes=85

Example 2—Curing Procedure B: A second sample batch was stored in containers in high humidity water bath at 58.3° C. for 26 days and then dried for one day at room temperature.

Properties for a 6×35 fraction were:
RTA=96.8%
Weight % moisture loss after drying one day at room temp=11.3%
Weight % moisture content (following drying at room temp)=2.6%

Bulk Density=59.5 lb/ft³
pH=11.1
% solid after moistened 8 minutes=90
% solid after moistened 16 minutes=90

Example 2—Curing Procedure C: A third sample batch was dried at 110° C. to approximately 12% moisture content and then stored in containers in high humidity water bath at 58.3° C. for 26 days and then tested without any further drying.

Properties for a 6×35 fraction were:
RTA=97.4%
Weight % moisture loss during the curing period=8.7%
Weight % moisture content (as tested following during) =7.1%
Bulk Density=64.1 lb/ft³
pH=11.1
% solid after moistened 8 minutes=95
% solid after moistened 16 minutes=95

Example 3: The recipe for example 3 was as follows. The dry ingredients of 111.4 grams of high calcium hydrated lime (Graymont), 93.6 grams of expanded perlite (Dicalite B4-P2-A), and 413.8 grams of dried dolomite stone dust (approximately 65% passing 200 mesh) were thoroughly blended in the order listed above into a homogeneous dry mixture. The mixture of the dry ingredients was then blended with 205.3 grams of water and 28.1 grams of Liquidow™ calcium chloride solution (32% calcium chloride solids) in an ~2-quart capacity stainless steel mixing bowl using a hand mixer fitted with traditional "flat blade" metal beaters to wet and thoroughly blend all the ingredients within about 10 seconds. Mixing was continued for approximately 30 seconds to initiate the transformation of the mixture into discrete granules.

Following the initial blending the granulation continued in the same bowl for approximately 2 minutes using a hand mixer with stiff spiral wire beaters. A fine water spray of 23.7 grams in total was added from a hand-held spray bottle to increase the size of the granules, which for this trial batch was about 16 mesh. These mixing procedures simulated the granulation which would occur in a commercial process pin mixer.

Following granulation with the hand mixer, the entire batch was tumbled for approximately two minutes (~50 revolutions) in a 16 inch diameter by 3.5 inch deep pelletizing pan inclined at 45° above horizontal to improve the roundness of the granules and provide a better estimate of granule properties if the granules would be produced in a commercial pin mixer/pelletizing pan process.

Following granulation, the batch had a moisture content of about 29.4% and bulk density of 46.6 lb/ft³. The batch was then divided into four smaller sample batches which were cured using the following procedures.

Example 3—Curing Procedure A: One sample batch was dried at 110° C. to approximately 18% moisture content, stored in a container in a high humidity water bath at 58.3° C. for 1 day, and then tested without any further drying.

Properties for a 6×35 fraction were:
RTA=82.2%
Weight % moisture loss after curing one day at 58.3° C.=15.8%
Bulk Density=50.8 lb/ft³
pH=12.0
% solid after moistened 8 minutes=80
% solid after moistened 16 minutes=80

Example 3—Curing Procedure B: A second sample batch was dried at 110° C. to approximately 18% moisture content, stored in a container in a high humidity water bath at 58.3° C. for 1 day, and then dried for one day at room temperature.

Properties for a 6×35 fraction were:
RTA=93.4%
Weight % moisture loss after drying one day at room temp=2.6%
Bulk Density=46.2 lb/ft³
pH=11.5
% solid after moistened 8 minutes=90
% solid after moistened 16 minutes=90

Example 3—Curing Procedure C: A third sample batch was dried at 110° C. to approximately 18% moisture content, stored in a container in a high humidity water bath at 58.3° C. for 2 days, and then tested without any further drying.

Properties for a 6×35 fraction were:
RTA=91.6%
Weight % moisture loss after curing two days at 58.3° C.=15.9%
Bulk Density=50.4 lb/ft³
pH=11.9
% solid after moistened 8 minutes=95
% solid after moistened 16 minutes=90

Example 3—Curing Procedure D: A fourth sample batch was dried at 110° C. to approximately 18% moisture content, stored in a container in a high humidity water bath at 58.3° C. for 2 days, and then dried for one day at room temperature.

Properties for a 6×35 fraction were:
RTA=94.4%
Weight % moisture loss after drying one day at room temp=3.5%
Bulk Density=46.1 lb/ft³
pH=11.5
% solid after moistened 8 minutes=95
% solid after moistened 16 minutes=90

Example 4: The recipe for example 4 was as follows. The dry ingredients of 66.8 grams high calcium hydrated lime (Graymont), 133.5 grams GGBFS (commercial grade ground granulated blast furnace slag) and 417.0 grams dried dolomite stone dust (approximately 65% passing 200 mesh) were thoroughly blended in the order listed above into a homogeneous dry mixture. The mixture of the dry ingredients was then blended with 99.9 grams of water in an ~2-quart capacity stainless steel mixing bowl using a hand mixer fitted with traditional "flat blade" metal beaters to wet and thoroughly blend all the ingredients within about 10 seconds. Mixing was continued for approximately 30 seconds to initiate the transformation of the mixture into discrete granules.

Following the initial blending the granulation continued in the same bowl for approximately 2 minutes using a hand mixer with stiff spiral wire beaters. A fine water spray of 9.8 grams in total was added from a hand-held spray bottle to increase the size of the granules, which for this trial batch was about 16 mesh. These mixing procedures simulated the granulation which would occur in a commercial process pin mixer.

Following granulation with the hand mixer, the entire batch was tumbled for approximately two minutes (~50 revolutions) in a 16 inch diameter by 3.5 inch deep pelletizing pan (inclined at 45° above horizontal) to improve the roundness of the granules and provide a better estimate of granule properties if the granules would be produced in a commercial pin mixer/pelletizing pan process.

Following granulation, the batch had a moisture content of about 16% and bulk density of 65.6 lb/ft³. The batch was then divided into three smaller sample batches which were cured using the following procedures.

Example 4—Curing Procedure A: One sample batch was stored in containers in water bath at room temperature for 26 days and then dried for one day at room temperature.
Properties for a 6×35 fraction were:
RTA=98.4%
Weight % moisture loss after drying one day at room temp=8.6%
Weight % moisture content (following drying at room temp)=3.8%
Bulk Density=62.2 lb/ft$^3$
pH=10.8
% solid after moistened 8 minutes=95
% solid after moistened 16 minutes=95

Example 4—Curing Procedure B: A second batch was stored in containers in high humidity water bath at 58.3° C. for 27 days and then dried for one day at room temperature.
Properties for a 6×35 fraction were:
RTA=98.2%
Weight % moisture loss after drying one day at room temp=8.7%
Weight % moisture content (following drying at room temp)=3.1%
Bulk Density=61.9 lb/ft$^3$
pH=11.5
% solid after moistened 8 minutes=95
% solid after moistened 16 minutes=95

Example 4—Curing Procedure C: A third batch was dried at 110° C. to approximately 12% moisture content and then stored in containers in high humidity water bath at 58.3° C. for 27 days and then tested without any further drying.
Properties for a 6×35 fraction were:
RTA=98.5%
Weight % moisture loss during the curing period=10.6%
Weight % moisture content (as tested following during)=2.9%
Bulk Density=65.0 lb/ft$^3$
pH=11.6
% solid after moistened 8 minutes=95
% solid after moistened 16 minutes=95

Example 5: The recipe for example 5 was as follows. The dry ingredients of 56.2 grams GGBFS, 77.3 grams expanded perlite (Dicalite B4-P2-A), 66.8 grams high calcium hydrated lime (Graymont), and 408.0 grams dried dolomite stone dust (approximately 65% passing 200 mesh) were thoroughly blended in the order listed above into a homogeneous dry mixture. The mixture of the dry ingredients was then blended with 115.0 grams of water and 91.8 grams of Fisher anhydrous sodium sulfate solution (9.80% sodium sulfate solids) in an ~2-quart capacity stainless steel mixing bowl using a hand mixer fitted with traditional "flat blade" metal beaters to wet and thoroughly blend all the ingredients within about 10 seconds. Mixing was continued for approximately 30 seconds to initiate the transformation of the mixture into discrete granules.

Following the initial blending the granulation continued in the same bowl for approximately 2 minutes using a hand mixer with stiff spiral wire beaters. A fine water spray of 22.7 grams in total was added from a hand-held spray bottle to increase the size of the granules, which for this trial batch was about 16 mesh. These mixing procedures simulated the granulation which would occur in a commercial process pin mixer.

Following granulation with the hand mixer, the entire batch was tumbled for approximately two minutes (~50 revolutions) in a 16 inch diameter by 3.5 inch deep pelletizing pan (inclined at 45° above horizontal) to improve the roundness of the granules and provide a better estimate of granule properties if the granules would be produced in a commercial pin mixer/pelletizing pan process.

Following granulation, the batch had a moisture content of about 27.1% and bulk density of 50.9 lb/ft$^3$. The trial batch was then divided into three smaller sample batches which were cured using the following procedures.

Example 5—Curing Procedure A: One sample batch was dried at 110° C. to approximately 15% moisture content, stored in a container in a high humidity water bath at 58.3° C. for 1 day, and then tested without any further drying.
Properties for a 6×35 fraction were:
RTA=95.4%
Weight % moisture loss after curing one day at 58.3° C.=12.1%
Bulk Density=53.1 lb/ft$^3$
pH=12.0
% solid after moistened 8 minutes=95
% solid after moistened 16 minutes=95

Example 5—Curing Procedure B: A second batch was dried at 110° C. to approximately 12% moisture content, stored in a container in a high humidity water bath at 58.3° C. for 1 day, and then tested without any further drying.
Properties for a 6×35 fraction were:
RTA=93.6%
Weight % moisture loss after curing one day at 58.3° C.=9.1%
Bulk Density=51.8 lb/ft$^3$
pH=12.1
% solid after moistened 8 minutes=90
% solid after moistened 16 minutes=90

Example 5—Curing Procedure C: A third batch was dried at 110° C. to approximately 12% moisture content, stored in a container in a high humidity water bath at 58.3° C. for 2 days, and then tested without any further drying.
Properties for a 6×35 fraction were:
RTA=92.8%
Weight % moisture loss after curing two days at 58.3° C.=9.0%
Bulk Density=50.7 lb/ft$^3$
pH=12.2
% solid after moistened 8 minutes=95
% solid after moistened 16 minutes=90

Example 6: The recipe for example 6 was as follows. The dry ingredients of 55.4 grams densified silica fume (Norchem), 73.8 grams expanded perlite (Dicalite B4-P2-A), 64.6 grams high calcium hydrated lime (Graymont), and 422.8 grams dried dolomite stone dust (approximately 65% passing 200 mesh) were thoroughly blended in the order listed above into a homogeneous dry mixture. The mixture of the dry ingredients was then blended with 175.5 grams of water in an ~2-quart capacity stainless steel mixing bowl using a hand mixer fitted with traditional "flat blade" metal beaters to wet and thoroughly blend all the ingredients within about 10 seconds. Mixing was continued for approximately 30 seconds to initiate the transformation of the mixture into discrete granules.

Following the initial blending the granulation continued in the same bowl for approximately 2 minutes using a hand mixer with stiff spiral wire beaters. A fine water spray of 24.4 grams in total was added from a hand-held spray bottle to increase the size of the granules, which for this trial batch was about 16 mesh. These mixing procedures simulated the granulation which would occur in a commercial process pin mixer.

Following granulation with the hand mixer, the entire batch was tumbled for approximately two minutes (~50 revolutions) in a 16 inch diameter by 3.5 inch deep pelletizing pan (inclined at 45° above horizontal) to improve the roundness of the granules and provide a better estimate of granule properties if the granules would be produced in a commercial pin mixer/pelletizing pan process.

Following granulation, the batch had a moisture content of about 25.2% and bulk density of 56.6 lb/ft$^3$. The batch was then divided into three smaller sample batches which were cured using the following procedures.

Example 6—Curing Procedure A: One sample batch was dried at 110° C. to approximately 12% moisture content, stored in a container in a high humidity water bath at 58.3° C. for 1 day, and then tested without any further drying.
Properties for a 6×35 fraction were:
RTA=95.0%
Weight % moisture loss after curing one day at 58.3° C.=10.3%
Bulk Density=53.9 lb/ft$^3$
pH=11.6
% solid after moistened 8 minutes=90
% solid after moistened 16 minutes=85

Example 6—Curing Procedure B: A second batch was dried at 110° C. to approximately 12% moisture content, stored in a container in a high humidity water bath at 58.3° C. for 2 days, and then tested without any further drying.
Properties for a 6×35 fraction were:
RTA=96.4%
Weight % moisture loss after curing two days at 58.3° C.=10.8%
Bulk Density=54.8 lb/ft$^3$
pH=11.6
% solid after moistened 8 minutes=95
% solid after moistened 16 minutes=95

Example 6—Curing Procedure C: A third batch was dried at 110° C. to approximately 12% moisture content, stored in a container in a high humidity water bath at 58.3° C. for 2 days, stored in a container at room temperature for 6 days, and then tested without any further drying.
Properties for a 6×35 fraction were:
RTA=96.4%
Weight % moisture loss after curing one day at 58.3° C.=10.3%
Bulk Density=54.6 lb/ft$^3$
pH=11.6
% solid after moistened 8 minutes=95
% solid after moistened 16 minutes=95

In accordance with the provisions of the patent statutes, the invention has been described in what is considered to represent its preferred embodiments. However, it should be noted that the invention can be practiced otherwise than as specifically illustrated and described without departing from its spirit or scope.

What is claimed is:

1. A method of making a non-dispersible granular substrate, comprising:
    forming a batch mixture comprised of one or more mineral-filler components, one or more pozzolan components, one or more hydrated lime components, and water; and
    co-pelletizing the batch mixture to form a plurality of granules;
    wherein the one or more pozzolan components, the one or more hydrated lime components, and the water react chemically to form a binder for the plurality of granules;
    wherein the one or more hydrated lime components account for from 5% to 25% of the weight of the resulting granules; and
    wherein the resulting granules are non-dispersible in water and have a bulk density of 25 lb/ft$^3$ or more and 75 lb/ft$^3$ or less.

2. The method of claim 1, wherein the batch mixture is a homogenous mixture.

3. The method of claim 1, wherein the one or more mineral-filler components are selected from the group consisting of dolomite, frac sand, granite dust, ground recycled concrete, limestone, marble dust, mason sand, and natural sand, or mixtures thereof.

4. The method of claim 1, wherein the mineral-filler component is selected from the group consisting of dolomite and limestone.

5. The method of claim 1, wherein the mineral-filler component is comprised of dolomite.

6. The method of claim 1, wherein the mineral-filler component comprises 15% to 90% by weight of the resulting granules.

7. The method of claim 1, wherein the one or more pozzolan components are selected from the group consisting of crushed pumice, diatomaceous earth, expanded perlite, expanded shale, fly ash, ground granulated blast furnace slag, calcined clays, rice husk ash, silica fume, and volcanic ash, or mixtures thereof.

8. The method of claim 1, wherein the one or more pozzolan components comprise 10% to 30% of the resulting granules.

9. The method of claim 1, wherein the hydrated lime is calcium/high calcium or dolomitic normally hydrated lime, pressure hydrated lime, or mixtures thereof.

10. The method of claim 1, wherein the hydrated lime is calcium/high calcium hydrated lime.

11. The method of claim 1, wherein the batch mixture comprises one or more lightweight additives having a bulk density less than 35 lb/ft$^3$.

12. The method of claim 11, wherein the one or more lightweight additives comprise cellulose, diatomaceous earth, expanded silica, expanded perlite, ground wheat straw, particle board flour, pulverized rice hulls, wood flour, or mixtures thereof.

13. The method of claim 12, wherein the one or more lightweight additives comprise expanded perlite.

14. The method of claim 1, wherein the bulk density of the resulting granules is from 35 lb/ft$^3$ to 65 lb/ft$^3$.

15. The method of claim 1, wherein the moisture content of the resulting granules is from 0% to about 16%.

16. A granular substrate made by the method of claim 1.

17. The granular substrate of claim 16, further comprising a pesticide or soil amendment.

18. A method of making a non-dispersible granular animal bedding, comprising:
    forming a batch mixture comprised of a mineral-filler component, a pozzolan component, hydrated lime, and water;
    co-pelletizing the batch mixture to form a plurality of granules, the pozzolan component, the hydrated lime, and the water reacting chemically to form a binder for the plurality of granules, the hydrated lime accounting for from 5% to 25% of the weight of the resulting granules; and
    applying a clumping agent to the plurality of granules.

* * * * *

UNITED STATES PATENT AND TRADEMARK OFFICE
CERTIFICATE OF CORRECTION

| | | |
|---|---|---|
| PATENT NO. | : 11,905,212 B1 | Page 1 of 1 |
| APPLICATION NO. | : 17/151303 | |
| DATED | : February 20, 2024 | |
| INVENTOR(S) | : Jonathan Smeltz | |

It is certified that error appears in the above-identified patent and that said Letters Patent is hereby corrected as shown below:

In the Specification

Column 3, Line 8, delete "-7-"

Signed and Sealed this
Second Day of April, 2024

Katherine Kelly Vidal
*Director of the United States Patent and Trademark Office*